March 7, 1950  J. LOCKENVITZ  2,499,925
GRAIN WAGON
Filed May 21, 1947  2 Sheets-Sheet 1
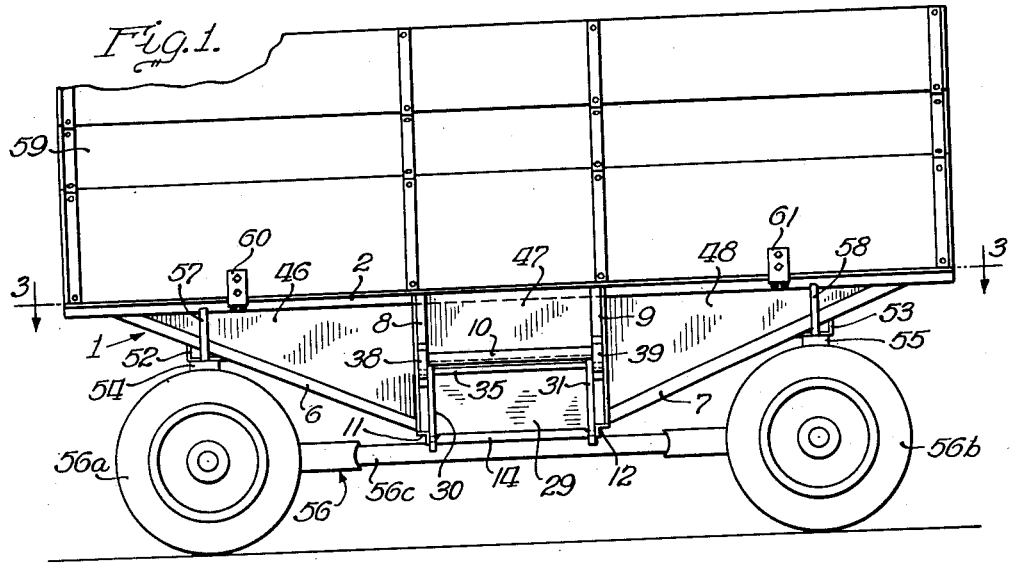
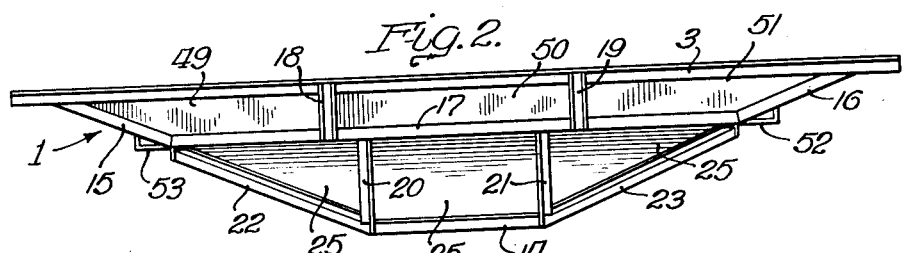
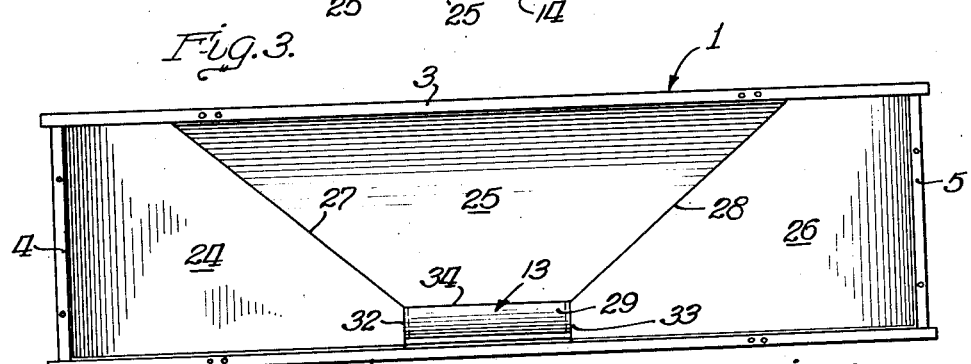
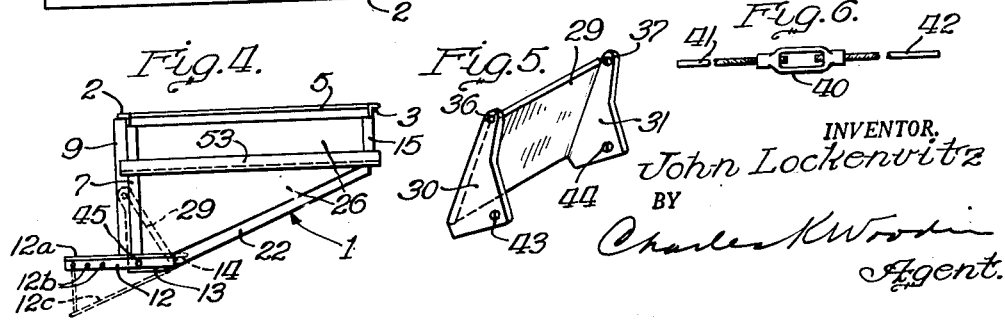
INVENTOR.
John Lockenvitz
BY
Charles K Woodin
Agent.

March 7, 1950 J. LOCKENVITZ 2,499,925
GRAIN WAGON
Filed May 21, 1947 2 Sheets-Sheet 2
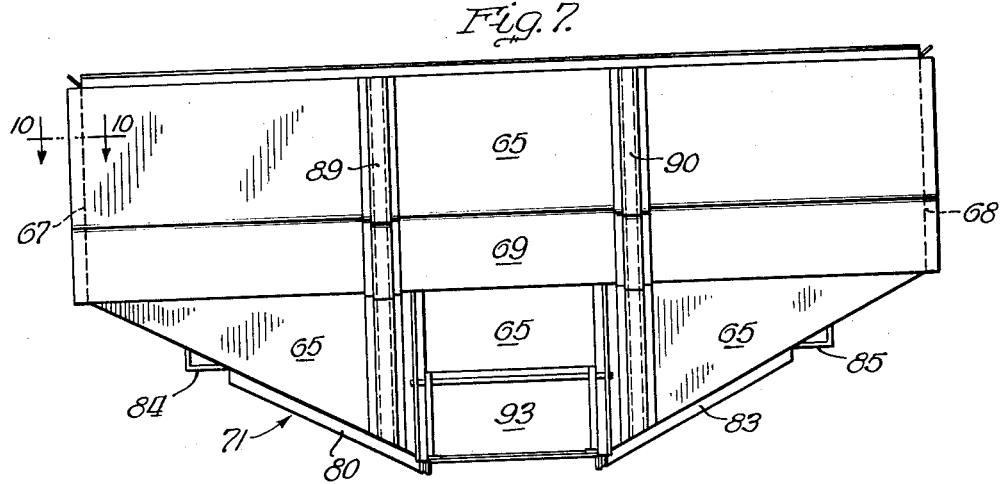
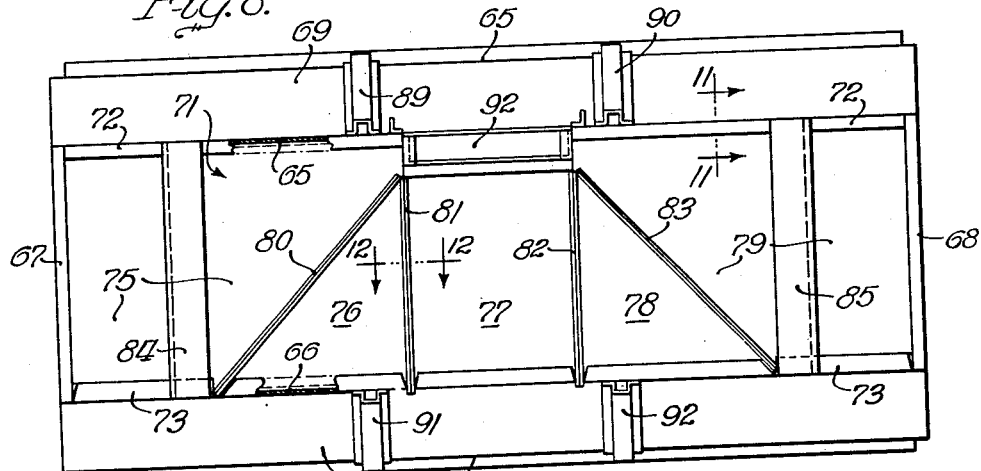
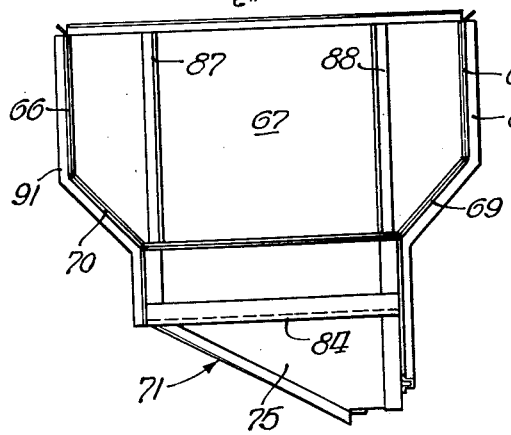
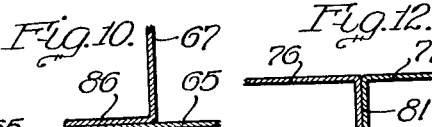
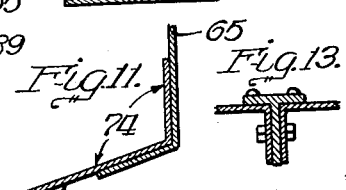
INVENTOR.
John Lockenvitz
BY
Charles K Woodin
Agent.

Patented Mar. 7, 1950

2,499,925

UNITED STATES PATENT OFFICE 2,499,925

GRAIN WAGON

John Lockenvitz, Bloomington, Ill.

Application May 21, 1947, Serial No. 749,528

10 Claims. (Cl. 298—27)

This invention relates to certain improvements in grain wagons which are more particularly adapted for use on farms to transport the grain from point to point and more particularly to deliver such grain to grain elevators and the like for storage purposes or for rail deliveries depending upon the demand for the grain.

It has been the practice in the past to use the usual farm grain wagon for cartage purposes and to deliver grain to a mill or elevator. Such wagons were normally raised by means of hydraulic jacks to lift one end thereof tilting such wagon endwise and permitting the grain to spill out of the end gate through the elevator grates or directly upon the elevator conveyors or whatever the particular arrangement happens to be. When a wagon of this type is being hauled by a tractor it becomes necessary to unhitch the tractor to permit the unloading of the wagon by the hydraulic lift means requiring the uncoupling and recoupling of the tractor with the wagon and also necessitating the use of the lift means to dump the grain out of the wagon end gate. Furthermore, the ordinary farm wagon of the conventional type is designed to haul a standard capacity of grain and the wagon bodies are normally supported relatively high with respect to the wheels of the carriage or chassis which is not the best arrangement where rough ground exists and where the weather or size of crop requires quick delivery of the grain from the field to the point of discharge.

It is one of the objects of the present invention to provide a grain wagon which will minimize to provide a grain wagon which will minimize handling thereby reducing labor to give the farmer and his help more time in the field, and also to provide a means for quickly unloading such wagon without the hydraulic equipment being necessary as in the case with the conventional farm grain wagon.

It is a further object of the present invention to provide a farm grain wagon with a specially designed bottom which lowers the center of gravity of the wagon and the grain load by utilizing the space above the wheeled chassis and laterally to at least one side thereof.

It is another object of this invention to provide such a bottom chute with sloping sections all inclined downwardly and toward one side of the wagon to provide a low point which together with the sloping sections of the bottom forms a discharge hopper hereby the wagon may be quickly and readily emptied under all conditions of use without necessitating the use of hydraulic lift equipment and also without requiring the tractor to be unhitched and rehitched thereafter during the unloading or discharging of the grain from the wagon. It should be noted that this particular style and design of wagon lends itself to a tandem arrangement whereby a tractor may pull two or more wagons in line to allow the tractor to pull each wagon successively over the grain grate of the conveyor at the elevator thereby quickly emptying each wagon without all of the attendant difficulties which exist in carrying out this operation with conventional forms of grain wagon.

It is a still further object of this invention to provide a wagon bottom having a unitary hopper and discharge unit which can be used in connection with a conventional grain wagon to transform the latter from such into a hopper and side discharge wagon to feasibly carry out the efficient discharge of the grain with very little change to the normal type of grain wagon. This change is made by removing the body of the conventional type of grain wagon from the chassis or bolsters of the wheeled vehicle and by removing the bottom from the body of the wagon and interposing the bottom chute hopper discharge unit between the bolsters of the wagon securing the box top without its bottom to the peripheral edges of the hopper insert.

A further object of the present invention is to provide such a hopper bottom either independently of the wagon body and wheeled vehicle or by incorporating the same as a unitary arrangement including the body although freely suspended upon the bolsters, wherein such hopper discharge bottom is designed as a uniquely trussed structure having side trusses and cross members forming a diagonally disposed truss to readily support the entire grain load of the wagon together with the wagon top with ease and facility.

All other objects and advantages relating to the salient features of the present invention embodied in a grain wagon shall hereinafter appear in the following detailed description having reference to the accompanying drawings illustrating several analogous constructions thereof.

In the drawings:

Fig. 1 is a side elevational view of a conventional farm wagon which has been converted into a vehicle having a chute bottom with the various grain supporting sections thereof inclining towards a common discharge opening having suitable closure mechanism for controlling the discharge of the grain;

Fig. 2 is a side elevational view of the grain supporting insert comprising the discharge chute mechanism as seen from the side oppositely disposed with respect to Fig. 1 and as the same would appear when removed from its supporting position upon the bolsters of the wheeled chassis and supporting the ordinary farm wagon box thereon;

Fig. 3 is a plan view of the grain wagon chute bottom as the same would appear when viewed from above and in the position illustrated in Fig. 1 and substantially as seen along the line 3—3 therein;

Fig. 4 is an end elevational view of the chute as viewed from the right hand sides of the chutes shown in Figs. 1 and 3 respectively;

Fig. 5 is small perspective view of a winged door which is used for closing the side opening of the chute and which can be locked into closed position by any suitable means until the time of discharge;

Fig. 6 is a small side elevational view of a buckle and double rod structure which is supplied with relatively steep and oppositely pitched threads to coact between the door of Fig. 5 and a fixed part of the chute structure for easily opening the door when the discharge of the grain or other material is required;

Fig. 7 is a side elevational view of a grain wagon body and bottom chute which are constructed and designed to bodily set upon the front and back bolsters of the wheeled chassis incorporating unique reinforcing means permitting the use of sheet steel or other thin metal in the construction of the entire unit with the proper reinforcement for supporting the load and wagon body as well as suspending the chute bottom upon the mobile unit;

Fig. 8 is a plan view of the wagon and chute bottom combination illustrated in Fig. 7 to further show certain details of construction thereof;

Fig. 9 is an end elevational view of this same grain wagon body and chute bottom combination as viewed from the left hand side of Figs. 7 or 8;

Fig. 10 is an enlarged detail horizontal cross sectional view of a portion of the wagon body substantially as viewed along the line 10—10 in Fig. 7;

Fig. 11 is an enlarged vertical cross sectional view of the joint between the wagon body and chute bottom substantially as seen along the line 11—11 in Fig. 8 but with the illustration in Fig. 11 being in the right side up position;

Fig. 12 is another enlarged detail cross sectional view in a vertical plane taken substantially along the line 12—12 in Fig. 8 to illustrate certain details of the reinforced construction of the chute bottom;

Fig. 13 is a modified arrangement of the joint illustrated in Fig. 12 to show certain other possible reinforcing variations that may be utilized at the joints of this kind comprising an integral part of the chute bottom assembly; and Fig. 14 is a further modified arrangement of a joint such as illustrated in Fig. 11 indicating the use of additional reinforcing means interposed between the side wall of the grain wagon and the chute bottom at their line of juncture.

The first form of the invention incorporates the principle of a unitary design of chute bottom which carries the total grain load and which is capable of a side discharge of such grain from the wagon through the operation of suitable closure means of any kind which can be readily opened for releasing the grain. This chute bottom in its entirety is adapted for bodily insertion between the wheeled chassis of the wagon and the wagon box itself which has previously had its usual bottom unbolted and removed therefrom.

This chute bottom is indicated in its entirety by the reference numeral 1 and comprises an upper supporting frame having longitudinal rails in the form of angle irons 2 and 3 connected by transverse rail angles 4 and 5 which are all welded together or otherwise suitably fastened to present a horizontally disposed supporting surface providing a ledge that is located in a common plane. The door side of the chute bottom 1 is constructed as an inverted deep truss suspended from the angle 2 which forms a part of this structure and comprises the downwardly inclined angles 6 and 7, vertical angles 8 and 9 joined by an auxiliary cross brace or angle 10 extending longitudinally with respect to the chute bottom and substantially parallel to the upper ledge of the rail angle 2. To further reinforce this front truss arrangement, a pair of short transverse angles 11 and 12 are secured to the vertical angles 8 and 9 and extend rearwardly the length of the chute opening as viewed and indicated by 13 in Fig. 3 to meet a longitudinally extending angle brace 14 shown in Figs. 1, 2 and 4. These angles 11 and 12 may be extended as at 12a in Fig. 4 and provided with appropriate openings 12b for attachment of a chute extension 12c shown in dotted lines. Suitable conventional conveyor means might also be supported from these angles 11 and 12.

Referring to Fig. 2, the rear portion of the chute bottom 1 is provided with a shallow truss which is also inverted and suspended from the ledge rail angle 3 utilizing inclined angles 15 and 16 welded or otherwise secured to a longitudinally extending angle 17 which extends substantially parallel to the ledge angle 3. Tension members such as the channels 18 and 19 comprise a portion of the shallower truss and connect the intermediate sections of the long ledge angle 3 and the lower parallel and longitudinal angle 17 completing the smaller depth rear truss just described.

In addition, the two trusses described as the relatively deep truss and the shallower truss are now connected by suitable angles to complete this load carrying cradle and wagon top supporting means, and such transverse supports comprise a pair of laterally inclined angles 20 and 21 extending at right angles between the trusses but dropping from the bottom angle rail 17 of the back truss to the lower cross rail 14 of the deeper front truss. In addition, a pair of downwardly and diagonally arranged angle members 22 and 23 extend from the lower end corners of the lower angle rail 17 of the rear truss to the rearward ends of the small transverse angles 11 and 12 which are suspended and attached to the vertical angles 8 and 9 and connected by the longitudinal cross rail 14, the angles 22 and 23 being rigidly secured to the rear ends of the small angles 11 and 12 just described as best illustrated in Fig. 4. Although these transverse supports extend between the two side trusses, they form an inclined and diagonally disposed truss which uses some of the parts of such other trusses as common members.

This entire chute bottom is enclosed by means of the three bottom sections 24, 25 and 26 supported upon the angle iron rail structure and seamed at 27 and 28 directly above and coincident with the extent of the lower diagonal angles 22 and 23. A bottom opening at the confluence of the three inclinations of the sections 24, 25 and 26 as indicated at 13 in Fig. 3 is closed by a suitable winged door 29 as best shown in Fig. 5, which has side wings 30 and 31 to enclose the chute bottom at the points 32 and 33 in Fig. 3 with the main portion of the door 29 inclined from the plane of the forward truss downwardly and toward the terminal edge 34 of the bottom chute section 25 defining this portion of the opening 13.

A suitable cross pin 35 as best shown in Fig. 1 passes through the openings 36 and 37 at the upper extremities of the wings 30 and 31 and extends into suitable bearings 38 and 39 supported by the vertical angles 8 and 9 of the front deep truss.

The door 29 is kept in closed position to dam any release of the grain through the opening 13 by means of the Fig. 6 unit which comprises a turnbuckle 40 connecting lock rods 41 and 42 which are each threaded with oppositely pitched threads of steep pitch to permit quick movement of the rods toward or away from each other by means of the operation or rotation of the turnbuckle 40. This turnbuckle unit is inserted between the wings 30 and 31 with the rods 41 and 42 inserted through the aligned openings 43 and 44 in the wings 30 and 31 of the door 29. As seen in Fig. 1, the wings 30 and 31 flank the vertical legs of the short transverse angles 11 and 12 which are also provided with openings such as 45 located in positions wherein such openings 45 are adapted to receive the ends 41 and 42 of the turnbuckle unit as the latter are extended oppositely outwardly with respect to the wings 43 and 44 of the door 29. When the turnbuckle unit is in position through the holes 43 and 44 and also entering the holes 45, the door 29 is disposed in a position to completely lock and shut off all grain leakage from the opening 13 of the chute bottom 1.

The turnbuckle structure has been eliminated from the Fig. 1 illustration for the sake of clarity to show certain other details of construction. However, it is also possible to use other means for locking the door 29 in respect to a fixed portion of the side deep truss structure which may function equally well in carrying out the operational functions of this invention.

As seen in Fig. 1, the forward or outer vertical door side of the chute bottom is closed by one or more vertical sheet metal sides such as shown at 46, 47 and 48, while the rear portion of the chute as seen in Fig. 2 may also be enclosed by one or more vertical plates or sheet metal sections 49, 50 and 51 completing this relatively light weight but mechanically stiffened and reinforced chute bottom incorporating the inverted truss structure with the lateral connecting truss and which chute presents a rail structure having a top ledge which is substantially equal in size to the peripheral bottom edge of the grain wagon supported and carried on this chute unit.

The supporting members of this chute consist of a pair of transverse angles 52 and 53 which are welded or otherwise firmly secured to the bottom portions of the side struts of the chute bottom trusses. The bottom faces or legs of these angles 52 and 53 are disposed in coplanar relationship and are spaced for suitable supporting engagement with the upper portions of the bolsters 54 and 55 of the wheeled carriage 56. Vertically disposed and spaced pins or standards 57—57 and 58—58 are secured to the bolsters 54 and 55 respectively to embrace or engage the side portions of the chute bottom to prevent lateral displacement of the same with respect to the bolsters 54 and 55. The bolsters are carried upon the wheel sets 56a and 56b that are longitudinally joined by a conventional form of reach 56c.

The wagon top shown in Fig. 1 and indicated at 59 merely comprises an open box of rectangular form wherein the bottom has been removed and this open box rests upon the upper rails comprising the angles 2, 3, 4 and 5 of the trusses. This wagon body 59 may be secured in any desirable way to the chute bottom 1 and for purposes of illustration suitable brackets such as 60 and 61 are indicated in Fig. 1 as being bolted to the sides of the wagon box 59 and to the lower edges of the horizontal legs of the upper rails of the chute bottom 1.

With this particular type of chute bottom and its unique reinforcing skeleton suitably supporting the sides and bottom sections of sheet metal or other closure means form a light weight but extremely rigid bottom which is insertable between the bolsters of a wheeled chassis 56 and the box top 59 of the wagon with the bottom removed to provide a means which will accelerate the discharge of grain from the farm grain wagon. In addition, although this insert or chute bottom only slightly raises the bottom of the wagon box 59 above the level of the bolsters 54 and 55, this chute bottom also increases the capacity of the wagon considerably by utilizing the space between the wheels and depending to at least one side of the chassis reach 56c which connects such wheels as is evident from the illustrations shown in Figs. 1 to 4 of the drawings. Furthermore, the center of gravity of the wagon is lowered by suspending a part of the additional load between the wheels and below the levels of the bolsters 54 and 55.

Referring now to the grain wagon body illustrated in Figs. 7 to 9 inclusive, it is seen that this structure utilizes a sheet metal construction of light weight but incorporating the same principles hereinbefore mentioned in connection with the preferred form, the only difference being that the latter form is designed as a complete combination unit which may entirely replace the old conventional form of wagon body or be incorporated into an entirely new wagon instead of having the conversional features of the preferred form for revamping the customary farm wagon for grain transportation and handling purposes.

In the latter construction the box top unit or grain body structure and the chute bottom structure are uniquely arranged to provide the same truss combining reinforcing elements which are present in the preferred chute bottom illustrated in Figs. 1 to 4 inclusive. The grain wagon in Figs. 7 and 9 includes a box top or grain bin having the sides 65 and 66 between ends 67 and 68, the sides 65 and 66 tapering downwardly and inwardly at 69 and 70 to meet the general peripheral contour of the chute bottom 71 which is of the same general proportions as the chute bottom illustrated in Figs. 1 to 4, and adapted for support upon suitable bolsters such as shown in these figures. The connecting portions of the chute bottom and the box top comprising the longitudinally running seams 72 and 73 which consist of lap joints as shown in Fig. 11 and as better illustrated in the broken away portions of Fig. 8 with parts of front and back sides 65 and 66 of the box top shown in section. With this arrangement, the lap joint indicated between the arrows 74 in Fig. 11 produces a reinforced angle iron structure which is substantially analogous to the angle iron structure of the preferred construction to form one portion of the truss structure which is adapted for reinforcing the chute bottom for the purposes of adequately suspending the chute and supporting the grain load as well as the entire load of the respective assembled sections of the grain wagon.

The grain supporting bottom of the chute bottom 71 comprises five sections 75, 76, 77, 78 and 79 which are connected with the wagon body sides 65 and 66 as just explained in connection with Fig. 11. In addition each of these sections are connected along vertically abutting seams 80, 81, 82 and 83 with the seam 81 illustrated in detail in Fig. 12. These joints therefore form the transverse and diagonally supporting and reinforcing strut members which are analagous to some of the cross angles of the diagonal truss illustrated and described in connection with Figs. 1 to 4 inclusive.

Base angles 84 and 85 extend transversely with respect to the chute bottom 71 and are welded or otherwise attached thereto with the bottom legs of these angles disposed in coplanar relationship and suitably positioned for resting upon the bolsters of the wheeled chassis of the wagon.

The four box sides of the wagon are lapped as shown in Fig. 10 to produce the reinforced composite vertical corner flanges 86 shown in Fig. 10 while the end portions of the wagon body are further strengthened by vertical angles such as 87 and 88 shown in Fig. 9.

To further strengthen and suspend the side trusses constructed by the overlapping seams of the unit, the forward or door side of the wagon includes suitable channels 89 and 90, while the other side portion of the wagon unit as shown in Fig. 8 includes the channels 91 and 92. With this particular construction the entire wagon side may be considered as a vertical extended portion of the side trusses which form the chute bottom supporting means.

As in the preferred form, a suitable door such as 93 shown in Figs. 7 and 8 completes the entire grain wagon enclosure producing a comparatively light weight structure of relatively great capacity in contrast with the conventional farm grain wagon, and a structure which has complete utility for the quick and easy handling of grains requiring less time for this chore and permitting the men to spend greater time in the fields during the harvesting of the grain.

Certain changes are possible in the exact constructions herein disclosed and described for producing a grain wagon of the type presented. Figs. 13 and 14 illustrate certain of such variations in providing a reinforcing seam or angle which is analagous to the strut elements of the truss or trusses that may be incorporated in a sheet metal construction of this type showing other adaptations of the same principles. Fig. 13 is analagous to the joint illustrated in Fig. 12, while Fig. 14 typifies a similar joint to that illustrated in Fig. 11.

Obviously, other changes and differentiations may be incorporated in the present grain wagon structure to carry out the principles of the present invention. All such changes in the exact form or shapes of the elements, or in the combination thereof, or as may be brought about through the substitution of equivalent mechanisms, shall be governed by the breadth and scope of the claims appended hereto and directed to the salient features of the present invention.

What I claim is:

1. A chute bottom for a farm grain wagon comprising a deep truss, a shallow truss, and a diagonally disposed truss including portions of each of said trusses and connecting the latter, closure means carried by said trusses and in the planes thereof and joined to form a grain hopper, and discharge means disposed at a low point of said hopper to normally retain the grain and to allow discharge thereof from said hopper.

2. A chute bottom for a conventional farm grain wagon adapted to be interposed between the wagon box and the wheel bolsters of the mobile unit to support said box with the latter's bottom removed, comprising a deep truss, a shallow truss, and an inclined truss connected therebetween, means for lining said trusses to retain grain, and spaced pad means connected with said trusses and adapted to rest upon the wheel bolsters to suspend the trusses therebetween, and said trusses having portions thereof disposed in coplanar relationship for attachment to said wagon box and to provide peripheral support therefor.

3. A chute bottom for a conventional farm grain wagon adapted to be interposed between the wagon box and the wheel bolsters of the mobile unit to support said box with the latter's bottom removed, comprising a deep truss, a shallow truss, and an inclined truss connected therebetween, means for lining said trusses to retain grain, and spaced pad means connected with said trusses and adapted to rest upon the wheel bolsters to suspend the trusses therebetween, and said trusses having portions thereof disposed in coplanar relationship for attachment to said wagon box and to provide peripheral support therefor, and discharge means arranged at a low point between members of said trusses to normally retain grain and to allow discharge of the grain from said chute bottom.

4. A chute bottom for a conventional farm grain wagon adapted to be interposed between the wagon box and the wheel bolsters of the mobile unit to support said box with the latter's bottom removed, comprising a deep truss, a shallow truss, and an inclined truss connected therebetween, means for lining said trusses to retain grain, and spaced pad means connected with said trusses and extending transversely thereof to connect and stabilize the deep and shallow trusses, said pad means each having horizontally disposed base elements adapted to rest upon the wheel bolsters to suspend the trusses therebetween, and said trusses having portions thereof disposed in coplanar relationship for attachment to said wagon box and to provide peripheral support therefor.

5. A chute bottom for a conventional farm grain wagon adapted to be interposed between the wagon box and the wheel bolsters of the mobile unit to support said box with the latter's bottom removed, comprising a deep truss, a shallow truss, and an inclined truss connected therebetween, means for lining said trusses to retain grain, and spaced pad means connected with said trusses and extending transversely thereof to connect and stabilize the deep and shallow trusses, said pad means each having horizontally disposed base elements adapted to rest upon the wheel bolsters to suspend the trusses therebetween, and said trusses having portions thereof disposed in coplanar relationship for attachment to said wagon box and to provide peripheral support therefor, said coplanar portions of said trusses and the horizontally positioned base elements of the spaced pad means being arranged in planes parallel with respect to each other whereby said wagon box is supported in horizontal relation upon equal height bolsters and with respect to the wheeled chassis.

6. A chute bottom for a farm grain wagon comprising a deep truss at one side, a shallow truss at the other side, and a diagonally disposed truss extending between the lower extremities of each of said trusses and connecting the same, closure means supported by said trusses and joined to form a hopper to hold grain with the low point thereof disposed adjacent the bottom portion of the deep truss, and releasable discharge means connected at said hopper low point and adapted for permitting discharge of said grain out of the side of said deep truss and adjacent the bottom thereof.

7. A chute bottom for a farm grain wagon comprising a deep truss at one side, a shallow truss at the other side, and a diagonally disposed truss extending between the lower extremities of each of said trusses and connecting the same, closure means supported by said trusses and joined to form a hopper to hold grain with the low point thereof disposed adjacent the bottom portion of the deep truss, and releasable discharge means connected at said hopper low point and adapted for permitting discharge of said grain out of the side of said deep truss and adjacent the bottom thereof, and means to support said trusses upon the bolsters of a wheeled chassis and to suspend the same between said wheels, said support means being arranged to give clearance for the deep side truss to depend into the space between the fore and aft wheels of the chassis, and said diagonal truss and the shallow truss being disposed in a predetermined relation with respect to the support means to clear the reach of said wheeled chassis and to bring the grain discharge point to or below the level of said reach.

8. A chute bottom for a grain carrier comprising a plurality of sheet metal sections, said sections being joined at predetermined lines of intersection to form coacting rigid lap joints to strengthen and support the intermediate portions of said sections, certain of said joints being arranged to form coacting inverted trusses for the bottom sides of said carrier, and certain other of said joints being arranged to form a transverse truss for connecting the side trusses, all of said trusses being adapted to suspend the chute bottom from a wheeled vehicle and to support the grain load of such carrier.

9. A chute bottom for a grain carrier comprising a plurality of sheet metal sections, said sections being joined at predetermined lines of intersection to form coacting rigid lap joints to strengthen and support the intermediate portions of said sections, certain of said joints being arranged to form coacting inverted trusses for the bottom sides of said carrier, and certain other of said joints being arranged to form a transverse truss for connecting the side trusses, all of said trusses being adapted to suspend the chute bottom from a wheeled vehicle and to support the grain load of such carrier, said sheet metal sections including vertically disposed side walls forming an enclosure above said chute bottom with the latter sections meeting in vertically disposed lap joints extending to said chute bottom, and channel members secured to the latter vertically disposed side wall sections of the enclosure and depending therefrom to connect with said chute bottom to support part of the load carried by the latter from said enclosure sections.

10. A chute bottom for a grain carrier comprising a plurality of sheet metal sections, said sections being joined at predetermined lines of intersection to form coacting rigid lap joints to strengthen and support the intermediate portions of said sections, certain of said joints being arranged to form coacting inverted trusses for the bottom sides of said carrier, and certain other of said joints being arranged to form a transverse truss for connecting the side trusses, all of said trusses being adapted to suspend the chute bottom from a wheeled vehicle and to support the grain load of such carrier, and transverse supporting pad members disposed and connected across the underside of said chute bottom between certain of said truss forming joints to bodily support the chute bottom and its load upon said wheeled vehicle.

JOHN LOCKENVITZ.

REFERENCES CITED

The following references are of record in the file of this patent:

UNITED STATES PATENTS

| Number | Name | Date |
|---|---|---|
| 708,134 | Glenn | Sept. 2, 1902 |
| 764,355 | Hart et al. | July 5, 1904 |
| 772,722 | Larry | Oct. 18, 1904 |
| 882,868 | Campbell | Mar. 24, 1908 |
| 1,029,894 | Schellenger | June 18, 1912 |
| 1,482,559 | Hart | Feb. 5, 1924 |